US00RE41358E

(19) United States
(12) Reissued Patent
Heiniger et al.

(10) Patent Number: US RE41,358 E
(45) Date of Reissued Patent: May 25, 2010

(54) AUTOMATIC STEERING SYSTEM AND METHOD

(75) Inventors: Richard W. Heiniger, Parkville, MO (US); Kent D. Funk, Robinson, KS (US); John A. McClure, Scottsdale, AZ (US); Dennis M. Collins, Fountain Hills, AZ (US); John T. E. Timm, San Jose, CA (US)

(73) Assignee: Hemisphere GPS LLC, Calgary, Alberta (CA)

(21) Appl. No.: 12/026,797

(22) Filed: Feb. 6, 2008

Related U.S. Patent Documents

Reissue of:
(64) Patent No.: 7,142,956
Issued: Nov. 28, 2006
Appl. No.: 10/875,776
Filed: Jun. 24, 2004

U.S. Applications:
(63) Continuation-in-part of application No. 10/804,721, filed on Mar. 19, 2004, now Pat. No. 7,437,230.
(60) Provisional application No. 60/456,130, filed on Mar. 20, 2003.

(51) Int. Cl.
*B62D 13/00* (2006.01)
*G01C 21/00* (2006.01)

(52) U.S. Cl. ..... 701/23; 180/9.1; 318/587
(58) Field of Classification Search ..... 701/23, 701/41, 50, 24, 213, 300; 180/9.1, 9.21, 168, 180/6.7, 6.2; 318/587
See application file for complete search history.

(56) References Cited

U.S. PATENT DOCUMENTS 3,727,710 A * 4/1973 Sanders et al. ..... 180/6.7
3,899,028 A * 8/1975 Morris et al.
4,180,133 A * 12/1979 Collogan et al.

(Continued)

FOREIGN PATENT DOCUMENTS

WO WO2002/080652 * 10/2002

OTHER PUBLICATIONS

U.S. Appl. No. 60/456,146, filed Mar. 20, 2003, McClure et al.*

U.S. Appl. No. 10/733,960, filed Dec. 11, 2003, McClure et al.*

Web page for Orthman Manufacturing co. regarding the "Tracer Quick–Hitch", www.orthman.com/htm/guidance-.htm.*

*Primary Examiner*—Dalena Tran
(74) *Attorney, Agent, or Firm*—Mark E. Brown

(57) ABSTRACT

An automatic steering system and method are provided for a vehicle including an hydraulic primary steering system. The automatic steering system includes a guidance module with a GPS receiver and a microprocessor adapted to process and store GPS data defining travel paths, which can be associated with a cultivated field in an agricultural vehicle application. An automatic steering module is connected to the guidance module and to a steering valve control block, which provides pressurized hydraulic fluid in parallel with the vehicle's primary hydrostatic steering system. The automatic steering system utilizes a constant factor, such as steering rate, for predictability and simplicity in the operation of the automatic steering system. A feedback loop from the vehicle hydrostatic steering system uses the vehicle's actual turning rate for comparison with a desired turning rate. The system is adapted for original equipment installation and retrofitting on vehicles, such as farm tractors, with various primary hydrostatic steering system configurations. An automatic steering method includes the steps of: initializing the system; adjusting the steering with an hydraulic valve to provide a constant steering rate; providing feedback corresponding to the vehicle's actual turning rate and combining the feedback with other input signals to provide automatic steering.

33 Claims, 15 Drawing Sheets

U.S. PATENT DOCUMENTS 4,637,474 A * 1/1987 Leonard
4,802,545 A * 2/1989 Nystuen et al. ..... 180/419
4,858,132 A * 8/1989 Holmquist
4,918,607 A * 4/1990 Wible
5,031,704 A * 7/1991 Fleischer et al. ..... 172/6
5,152,347 A * 10/1992 Miller
5,156,219 A * 10/1992 Schmidt et al.
5,207,239 A * 5/1993 Schwitalla
5,255,756 A * 10/1993 Follmer et al.
5,369,589 A * 11/1994 Steiner
5,390,125 A * 2/1995 Sennott et al.
5,476,147 A * 12/1995 Fixemer
5,511,623 A * 4/1996 Frasier
5,592,382 A * 1/1997 Colley
5,612,883 A * 3/1997 Shaffer et al.
5,615,116 A * 3/1997 Gudat et al.
5,644,139 A * 7/1997 Allen et al.
5,664,632 A * 9/1997 Frasier
5,684,696 A * 11/1997 Rao et al.
5,717,593 A * 2/1998 Gvili
5,725,230 A * 3/1998 Walkup
5,765,123 A * 6/1998 Nimura et al.
5,838,562 A * 11/1998 Gudat et al.
5,918,558 A * 7/1999 Susag ..... 111/200
5,923,270 A * 7/1999 Sampo et al. ..... 340/988
5,928,309 A * 7/1999 Korver et al. ..... 701/214
5,941,317 A * 8/1999 Mansur
5,945,917 A * 8/1999 Harry
5,956,250 A * 9/1999 Gudat et al.
5,987,383 A * 11/1999 Keller et al.
6,014,608 A * 1/2000 Seo
6,233,511 B1 * 5/2001 Berger et al. ..... 701/50
6,314,348 B1 * 11/2001 Winslow ..... 701/23
6,389,345 B2 * 5/2002 Phelps
6,397,147 B1 * 5/2002 Whitehead
6,431,576 B1 * 8/2002 Viaud et al.
6,434,462 B1 * 8/2002 Bevly et al.
6,469,663 B1 * 10/2002 Whitehead et al.
6,539,303 B2 * 3/2003 McClure et al.
6,553,299 B1 * 4/2003 Keller et al.
6,631,916 B1 * 10/2003 Miller
6,865,465 B2 * 3/2005 McClure
2002/0072850 A1 * 6/2002 McClure et al.
2004/0186644 A1 * 9/2004 McClure et al. ..... 701/50
2004/0210357 A1 * 10/2004 McKay et al. ..... 701/23

* cited by examiner

AUTO-DISENGAGE AND AUTO-ENGAGE SUBROUTINE

P = PRESSURE $$G = \text{GAIN} = \frac{\text{DIFFERENTIAL RPM}}{\text{SIGNAL (PRESSURE)}}$$

| SETUP MENU | | |
|---|---|---|
| MENU ITEM | DISPLAY SEQUENCE | INSTRUCTIONS |
| Steering Adjustment | <== DN UP==><br>ENTER TO STOP | Press DOWN ARROW to move vehicle steering to the left. Press ENTER to stop at left extreme.<br><br>Press UP ARROW to move vehicle steering to the right. Press ENTER to stop at right extreme.<br><br>Adjust steering control rate knob to achieve desired end to end steering cycle time. |
| Sensitivity Adjustment | <== DN UP==> | Press DOWN ARROW to decrease sensitivity/(turning rate)<br><br>Press UP ARROW to increase sesitivity/(turning rate) |
| Auto Engage | >ON<br>OFF | Select if Auto Engage feature is enabled. (See page 10) |
| Diagnostics | Ver 1.0<br>GYRO ??? | Displays current console software version, and internal gyro sensor data. The number indicates vehicle turning rate, negative to the left, positive to the right |

FIG. 8

Vehicle Hydrostatic Steering System
Case A : Closed Center, Load-Sense, Non-Reactive Vehicle Hydrostatic Steering System
Case B: Closed Center, Pressure Comp, Non-Reactive Vehicle Hydrostatic Steering System
Case C: Open Center, Non-Reactive Reactive Steering Isolation Circuit
Cases A, B & C Vehicle Hydrostatic Steering System
Case D: Dual Path, Differential Track Drive

AUTOMATIC STEERING SYSTEM AND METHOD

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. patent application Ser. No. 10/804,721, filed Mar. 19, 2004*, now U.S. Pat. No. 7,437,230* which [is incorporated herein by reference] *claims the benefit of U.S. provisional application No. 60/456,130, filed Mar. 20, 2003.*

BACKGROUND OF THE INVENTION

1. Field of the Invention

The present invention relates generally to automatic steering, and in particular to a system and method for providing GPS-based guidance for an auxiliary steering system, which is installed in parallel with a primary steering system of a vehicle and utilizes a constant factor, such as the vehicle steering rate, in a control system with a feedback loop.

2. Description of the Related Art

In the field of vehicle guidance and navigation, the Global Positioning System (GPS) has enabled a wide range of applications. For example, various GPS receivers are available for aviation, marine and terrestrial vehicles. The GPS information provided by such receivers can be processed and used for navigation. In more sophisticated systems, vehicle guidance can be automatically controlled using such information. For example, a predetermined travel or flight path can be programmed into an on-board computer. The vehicle guidance system can automatically maintain appropriate course parameters, such as course, heading, speed, altitude, etc. Control system, feedback theory and signal filtering techniques can be used to interactively anticipate (with higher order systems) and compensate for course deviations and navigation errors. Such sophisticated autopilot and automatic steering systems tend to involve powerful computers and complex flight and steering controls integrated with manual controls.

Accurate vehicle and equipment guidance is an important objective in agriculture. For example, tilling, planting, spraying, fertilizing, harvesting and other farming operations typically involve specialized equipment and materials, which are operated and applied by making multiple passes over cultivated fields. Ideally, the equipment is guided through accurately-spaced passes or swaths, the spacing of which is determined by the swatch width of the equipment. Gaps and overlaps can occur when operators deviate from the ideal guide paths, resulting in under-coverage and over-coverage respectively. Such gaps and overlaps are detrimental to agricultural operations and can reduce crop yields. For example, gaps in coverage reduce the effective areas of fields being cultivated and treated. Overall crop production may suffer as a result. Overlaps in coverage tend to be inefficient and wasteful of materials, such as fertilizer, pesticides, herbicides, seed, etc. Another potential problem with overlapping coverage relates to the potentially crop-damaging effects of double applications of certain agricultural chemicals.

Previous systems for assisting with the guidance of agricultural equipment include foam markers, which deposit foam along the swatch edges. The foam lines produced by foam markers provide operators with visible reference lines on which subsequent passes can be aligned. However, foam marking systems consume foam-making materials and provide only temporary foam marks.

GPS technology advanced the field of agricultural guidance by enabling reliable, accurate systems, which are relatively easy to use. For example, the OUTBACK S™ steering guidance system, which is available from RHS, Inc. of Hiawatha, Kans. and is covered by U.S. Pat. No. 6,539,303 and No. 6,711,501, which are incorporated herein by reference, includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas.

The OUTBACK S™ GPS guidance system provides the equipment operators with real-time visual indications of heading error with a steering guide display and crosstrack error with a current position display. They respectively provide steering correction information and an indication of the equipment position relative to a predetermined course. Operators can accurately drive patterns in various weather and light conditions, including nighttime, by concentrating primarily on such visual displays. Significant improvements in steering accuracy and complete field coverage are possible with this system. However, it lacks the "hands off" capability and inherent advantages of automatic steering, which are addressed by the present invention.

Heretofore there has not been available an automatic steering system and method with the advantages and features of the present invention. In particular, there has not been available a system adapted for original equipment or retrofit installations in parallel with various vehicle hydrostatic steering configurations, which system provides automatic steering assistance using a constant factor, such as the vehicle steering rate, in a control system with a feedback loop.

SUMMARY OF THE INVENTION

In the practice of an aspect of the present invention, an automatic steering system and an automatic steering method are provided for a vehicle. The vehicle can comprise a motive component, such as a tractor, and a working component connected thereto by a hitch. The system includes a GPS receiver connected to a guidance controller, which includes a microprocessor adapted for storing and processing GPS information. An auxiliary steering subsystem is installed in parallel with the vehicle's primary hydrostatic steering system, and includes an hydraulic steering valve control block connected to the guidance controller and receiving steering input signals therefrom. The system utilizes a constant steering factor, such as a constant steering rate, which is implemented with "left", "right" and "none" steering correction signal inputs from the guidance controller to the steering valve control block. The vehicle's hydraulic steering is thus biased right or left to maintain a predetermined vehicle course. A feedback loop is provided from the vehicle's primary steering system through a gyroscopic yaw rate correction component to the guidance controller for determining the necessary steering corrections as a function of the desired and actual turning rates. The automatic steering system of the present invention can be installed in a wide variety of agricultural vehicles and equipment. For example, tractors and special-purpose, self-propelled agricultural equipment, such as sprayers and combines, can be equipped with the automatic steering system of the present invention in parallel with the primary hydrostatic steering systems commonly used in modern tractors and other farming equipment.

BRIEF DESCRIPTION OF THE DRAWINGS

FIG. 8 is a screen display of a setup menu.

DETAILED DESCRIPTION OF THE PREFERRED EMBODIMENTS

I. Introduction and Environment

Figure 1:
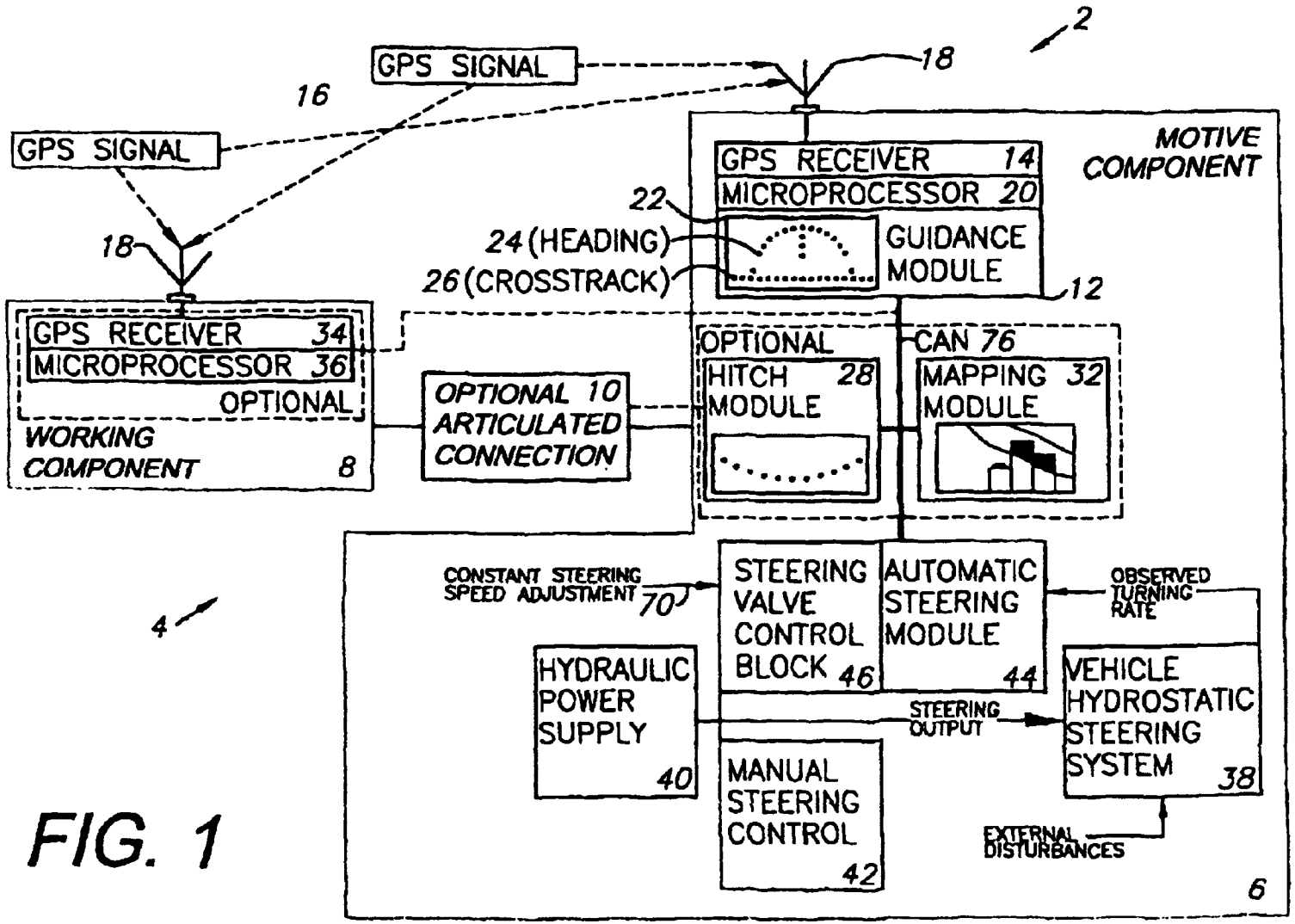
FIG. 1 is a block diagram of an automatic steering system comprising an aspect of the present invention, shown in a vehicle including a motive component connected to a working component.
Figure 2:
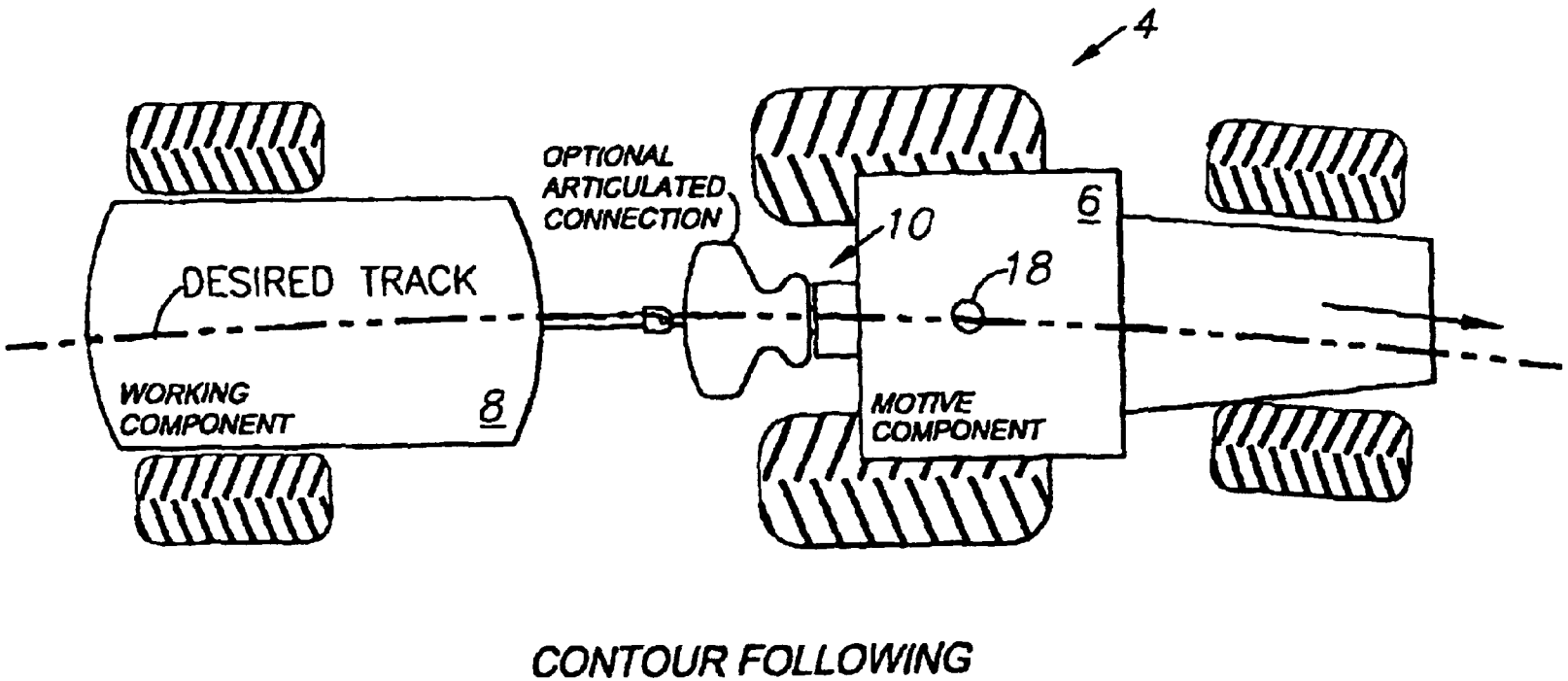
FIG. 2 is a top plan view of the vehicle, shown following a contour path.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

Referring to the drawings in more detail, the reference numeral 2 generally designates an automatic steering system according to an aspect of the present invention. Without limitation on the generality of useful applications of the steering system 2, by way of example, it is shown and described installed on an agricultural vehicle 4 comprising a motive component (e.g., a tractor) 6 connected to a working component 8 by an optional, articulated connection 10.

II. Guidance Module 12

The automatic steering system 2 includes a guidance module comprising a guidance controller and path planner 12 and a GPS receiver 14 receiving signals from GPS signal sources 16, such as the GPS satellite constellation or ground-based reference transmitters, through an antenna 18 mounted on the cab roof or some other suitable location. The receiver 14 is connected to a microprocessor 20, which provides a graphic display 22 including a heading indicator 24 and a crosstrack error indicator 26, both of which comprise LED indicator light patterns. The guidance module 12 and its operation are described in U.S. Pat. No. 6,539,303 and No. 6,711,501.

An optional hitch module 28 can be provided for controlling an articulated hitch 10, which shifts the working component 8 laterally in order to compensate for course deviations by the motive component 6. Such a hitch is shown in U.S. Pat. No. 6,631,916, which is incorporated herein by reference, and is available from RHS, Inc. of Hiawatha, Kans. under the trademark OUTBACK HITCH™. Another optional component comprises a mapping module 32, which performs mapping functions and provides a graphic display showing field areas treated, current travel paths and other information. For example, the system 2 can calculate the area of a field using the GPS coordinates of the field perimeter, which information can be processed, stored and displayed with the mapping module 32. A compatible mapping module is available from RHS, Inc. under the trademark OUTBACK 360™.

The working component 8 can optionally be equipped with its own GPS receiver 34 and microprocessor 36, which can be linked to the motive component guidance module 12. The use of two GPS receivers and microprocessors in this configuration can enhance guidance accuracy by compensating for GPS positioning discrepancies between the components 6, 8. Without limitation on the generality of vehicle steering systems that are compatible with the automatic steering system 2 of the present invention, the vehicle 4 includes a hydrostatic steering system 38 with an hydraulic power supply (e.g., an hydraulic tank and pump) 40, which is operated by the steering wheel manual steering control 42.

The automatic steering module 44 is connected to the guidance module 12 and receives GPS-based navigation signals as input therefrom, which are used to generate output to a steering valve control block 46, which in turn provides steering direction hydraulic output to the vehicle hydrostatic steering system corresponding to "right", "left" and "none" directional changes. The automatic steering system 2 utilizes a constant factor, such as the steering rate, which is adjustable as an input to the steering valve control block 46. As described below, this value normally remains constant after an initial adjustment by the operator to accommodate particular equipment configurations and operating conditions. The vehicle hydrostatic steering system 38 is affected by external disturbances, such as those associated with the operation of the vehicle 4. The automatic steering control logic accommodates and compensates for such external disturbances.

Figure 3:
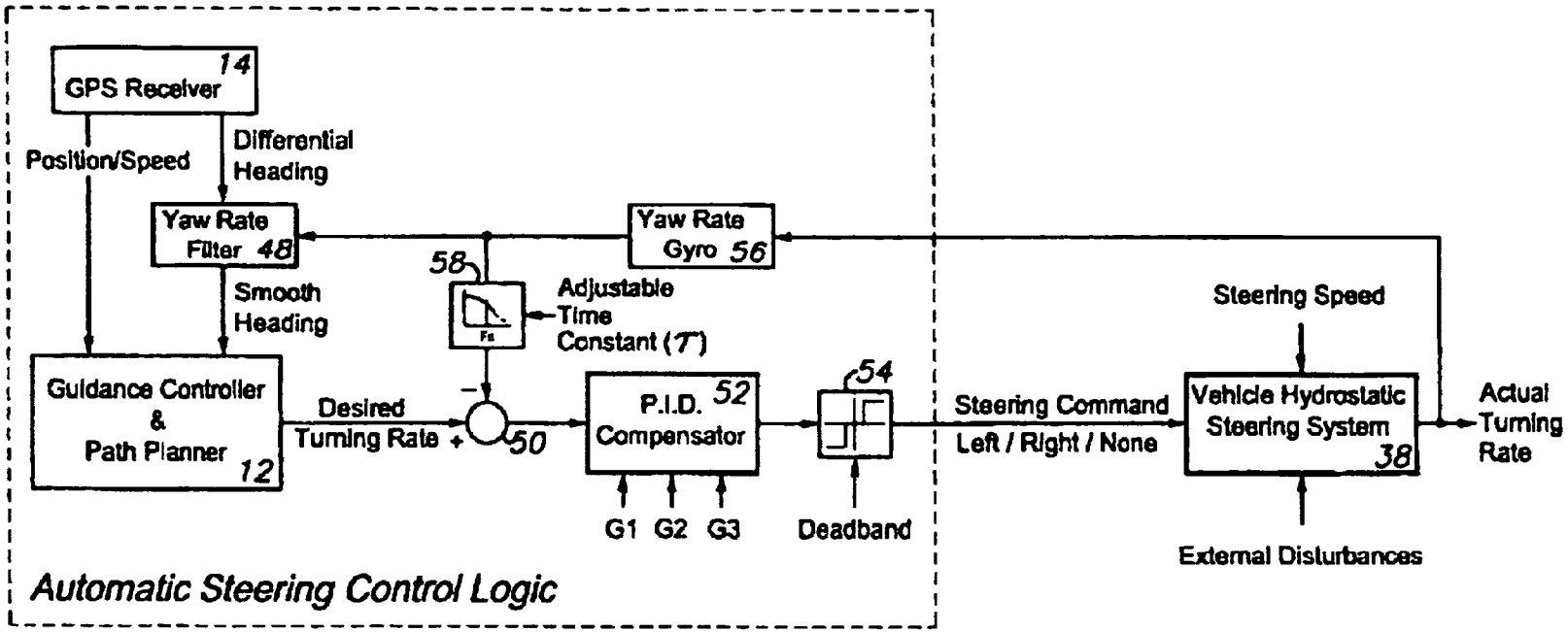
FIG. 3 is a schematic diagram showing the automatic steering control logic and a feedback loop.

FIG. 3 shows the automatic steering control logic in a feedback loop with the vehicle steering system 38. Utilizing position/speed input from the GPS receiver 14 and smooth heading feedback input from a yaw rate filter 48, the guidance controller and path planner 12 produces a desired turning rate for comparison to a feedback actual turning rate at a summer 50, the resulting error value from which is input to a proportional integral derivative (PID) compensator 52, with gain adjustments G1, G2 and G3. A deadband filter 54 defaults to a "none" steering command until predetermined signal thresholds are reached, which cause "left" or "right" steering command outputs to the vehicle steering system 38. Significant advantages in simplicity of construction, programming and operation are achieved by limiting the available steering commands to left/right/none, as opposed to more complex solutions involving proportional steering correction commands. For example, the steering valve control block 46 can be constructed with relatively simple, solenoid-activated, on-off hydraulic valves, thus avoiding the hardware and software complexities associated with proportional steering correction.

Actual turning rate (typically °/sec.) is a function of the steering command signal, the preset steering speed constant, vehicle speed and external disturbances associated with operation of the vehicle 2. This value is fed back to an inertial based yaw rate gyro 56 and is further filtered by a low pass frequency cutoff noise filter 58 to provide an output corresponding to an observed turning rate for combining with the desired turning rate at the summer 50. The filter 58 has a first-order control variable comprising an adjustable time constant Γ (tau). The inertial based yaw rate gyro 56 also provides input to the yaw rate filter 48 for combining with a differential heading from the GPS receiver 14 to provide a smooth heading input to the guidance controller and path planner 12.

III. Automatic Steering Method

Figure 4:
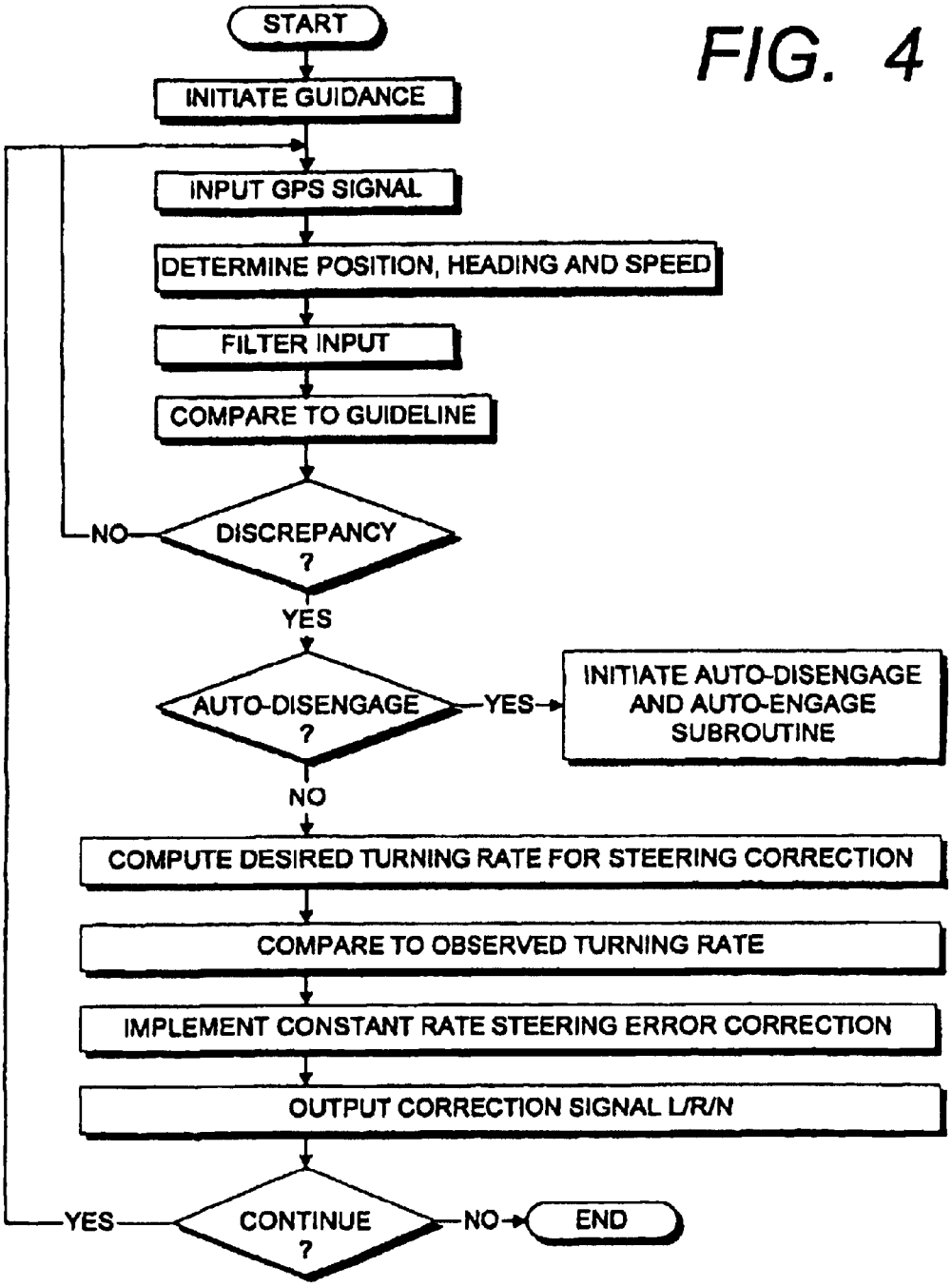
FIG. 4 is a flowchart of an automatic steering method comprising an aspect of the invention.
Figure 5:
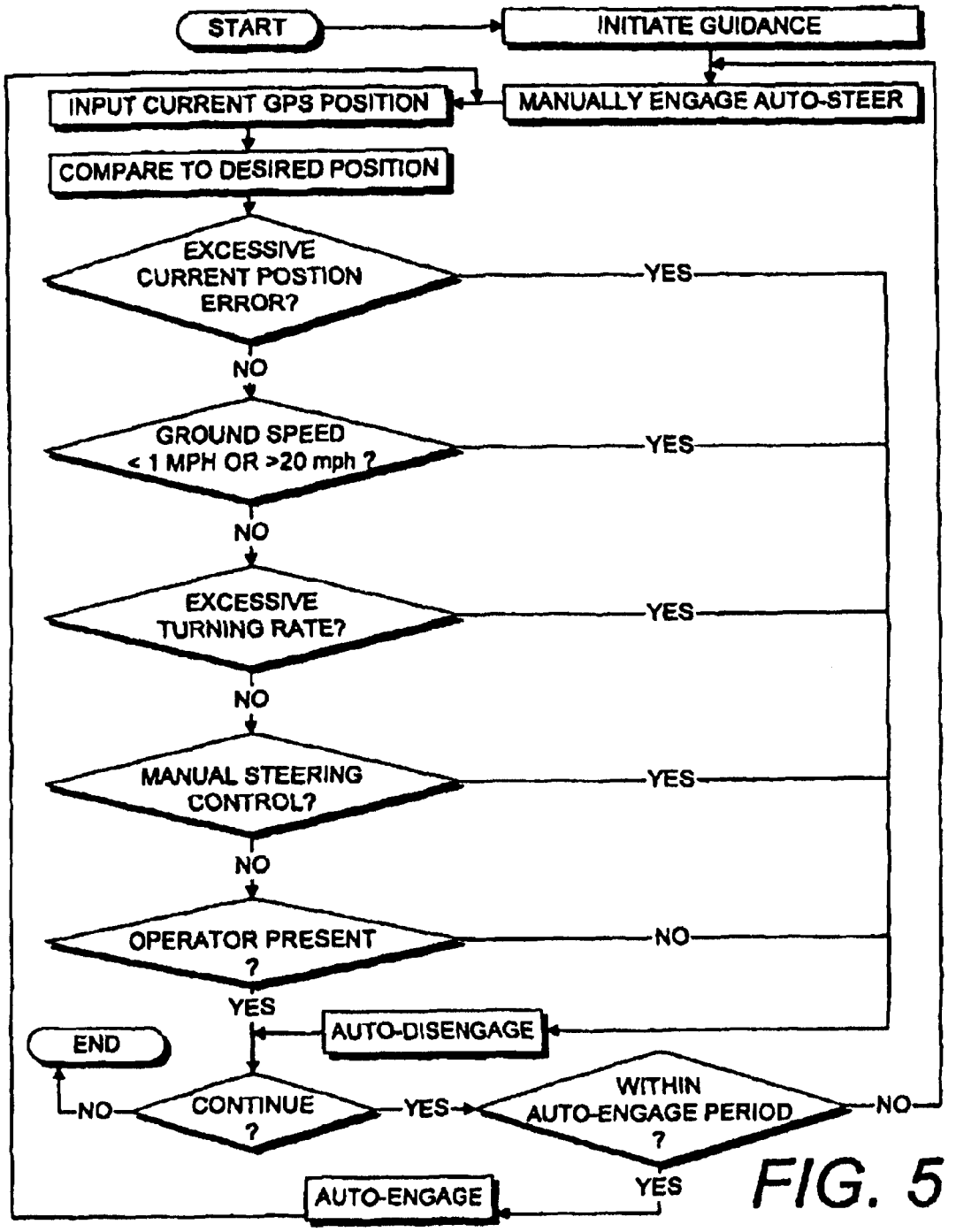
FIG. 5 is a flowchart of an auto-disengage and auto-engage subroutine.

FIG. 4 is a flowchart showing an automatic steering method according to the present invention. The automatic steering method accommodates both straight-line (i.e. "A–B") and contour guidance. The system 2 can be switched between each operating modes while operating. The system 2 is programmed to automatically disengage and engage the steering function upon encountering certain predetermined conditions, as indicated by the auto-disengage decision step, which initiates the auto-disengage and auto-engage subroutine. FIG. 5 shows the auto-disengage and auto-engage subroutine. Without limitation on the various engage/disengage conditions that the system 2 can accommodate, examples of include: excessive current position error, which would be triggered by the driver leaving the area of the agricultural operation; ground speed too slow or too fast for effective automatic steering; excessive turning rate; manual steering control corresponding to the operator taking over steering function; and a "deadman switch" operator absent condition. Various other events and conditions can be programmed to activate the auto-disengage subroutine. Upon disengagement, the system 2 will automatically reengage if the disengage condition is removed within a certain time period. For example, the operator may return to the area of previous guidance and resume an agricultural operation within the prescribed time limit. If the time limit for automatic resumption is exceeded, the auto-steer function can be manually reengaged.

Figure 6:
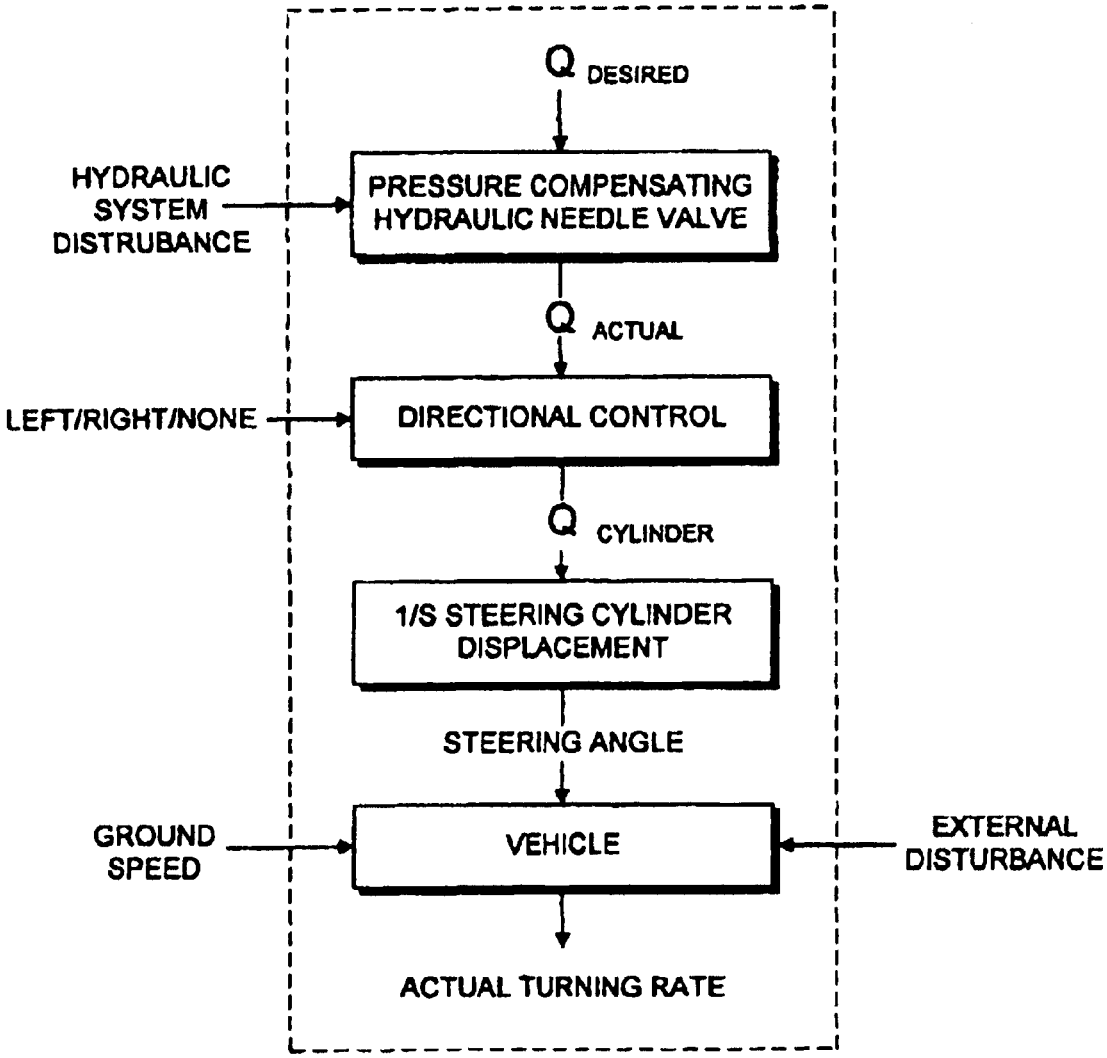
FIG. 6 is a flowchart of a subroutine for determining an actual turning rate in a vehicle with an hydraulic piston-and-cylinder unit steering actuator.
Figure 7:
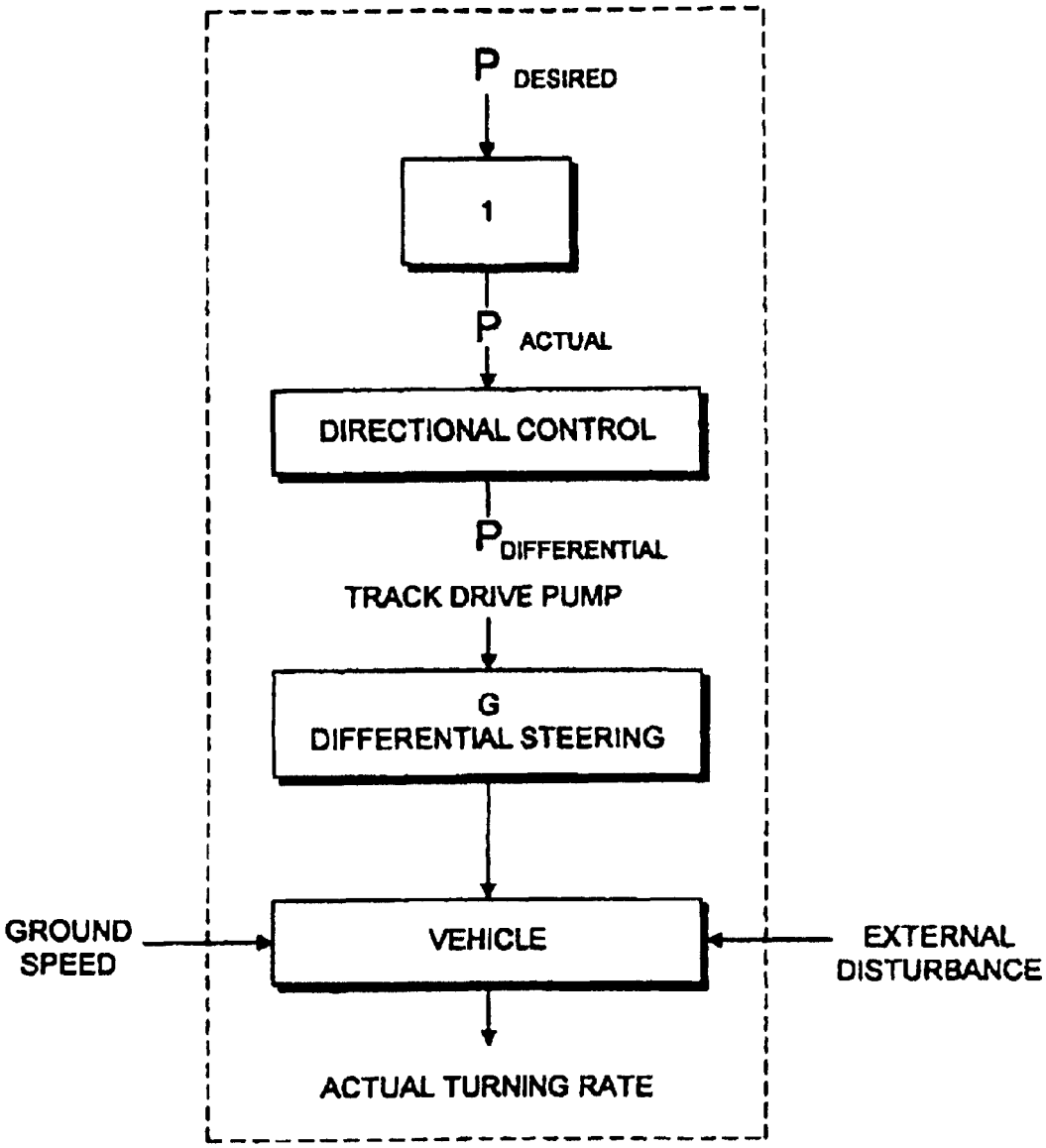
FIG. 7 is a flowchart of a subroutine for determining an actual turning rate in a track drive vehicle.

FIG. 6 is a flowchart of the subroutine for determining actual turning rate. A value Q(desired) is input and manually adjusted with a manual steering rate control valve 70, such as a needle valve, as discussed in more detail below. Hydraulic system disturbances, such as hydraulic pressure demands from other equipment on the vehicle 4, also affect the output Q(actual). Left/right/none directional instructions are input to the directional control and output to an hydraulic piston-and-cylinder steering unit 68, the displacement of which provides a feedback variable (l/s) and determines the steering angle, which in turn provides the actual turning rate as a function of ground speed and external disturbance. FIG. 7 is a similar flowchart for determining actual turning rate in a track drive vehicle utilizing the operating variables corresponding to hydraulic pressure (P) and gain (G).

FIG. 8 is a setup menu, which can be displayed by the guidance module 12, for example when the system 2 commences operation. The steering adjustment step utilizes the manual steering control rate needle valve 70 for adjusting the output of the steering valve control block 46, which in turn controls the steering speed. The down and up arrows of the guidance module 12 enable positioning the piston and cylinder steering unit 68 at its extreme left and extreme right steering angles respectively. By timing the end-to-end travel time, the operator can determine if the steering control rate valve 70 requires adjustment. For example, 25 seconds of end-to-end travel time is generally suitable for an initial steering control rate valve 70 calibration, subject to further adjustments according to operator preferences, equipment configurations and operating conditions. Opening the steering control rate valve 70 increases the steering control rate and results in more aggressive steering corrections and reduced guidance tracking error. However, if the steering control rate is too high, unstable steering corrections and larger errors can occur. Decreasing the steering control rate by closing the valve 70 generally provides greater stability and smoother response, although an excessively low rate can cause sluggish steering corrections and large tracking errors. Accordingly, the valve 70 should be fine-adjusted for smooth response and minimum tracking errors.

The sensitivity adjustment controls the deadband filter 54. Increasing the deadband width reduces sensitivity and vice versa. Excessive sensitivity tends to result in overreaction by the system 2, whereas insufficient sensitivity can cause excessive steering errors. Upon successfully adjusting the steering and system sensitivity as described above, the system 2 will generally require little, if any, further adjustment unless equipment configurations and operating conditions change. The auto-engage subroutine (FIG. 5) can be selectively enabled. The diagnostics feature facilitates troubleshooting the system 2 and its operation. For example, the inertial based yaw rate gyro 56 measures and stores sensor data corresponding to negative values for left-hand turns, positive values for right-hand turns and near-zero values for straight-line travel. Such values can provide useful diagnostic information concerning the operation of the system 2.

Figure 9:
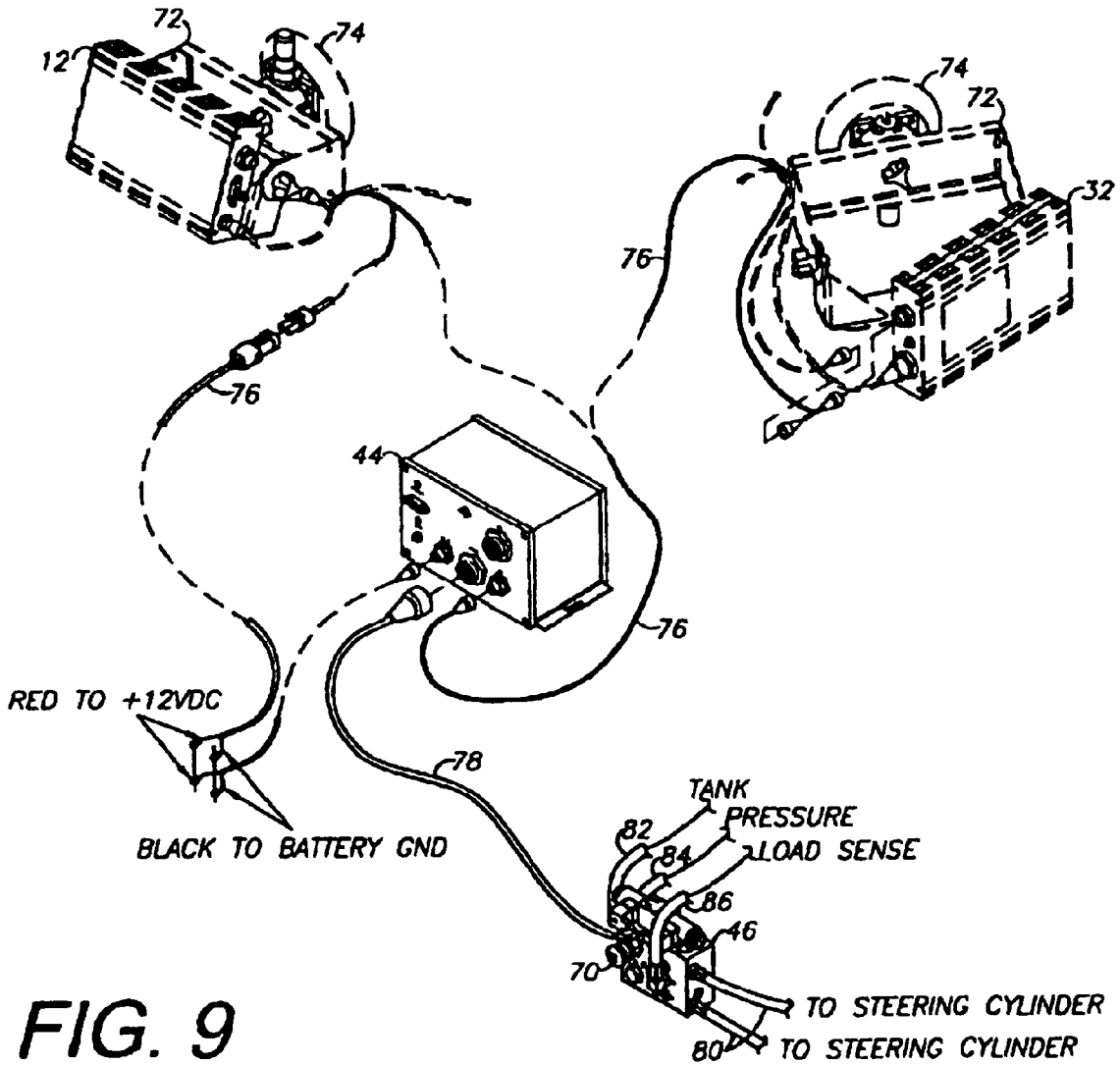
FIG. 9 is a diagram showing the major component of the system and their connections to each other and to a vehicle.

FIG. 9 shows the major vehicle-mounted components of the system 2 in a typical installation for an agricultural vehicle, such as a tractor. The guidance module 12 is attached to a vehicle surface, such as the inside of the windshield for convenient viewing, by a mounting bracket 72, which can be secured in place by a suction cup 74. An optional mapping module 32 can also be secured in a conveniently viewable location by a similar bracket 72 and suction cup 74. The guidance, mapping and automatic steering modules 12, 32 and 44 are interconnected by a suitable wiring harness of CAN cables 76, which also connect to an electrical power source, such as the vehicle's electrical system. The optional hitch module 28 is likewise adapted for mounting in the vehicle cab and can be connected to the other modules. A cable 78 extends from the automatic steering module 44 to the steering valve control block 46, which is connected to the vehicle steering cylinder 68 by block-to-cylinder hydraulic lines 80. Additional hydraulic lines 82, 84 and 86 are connected to the tank and pump of the hydraulic power supply 40 and a load sensing device.

Figure 10:
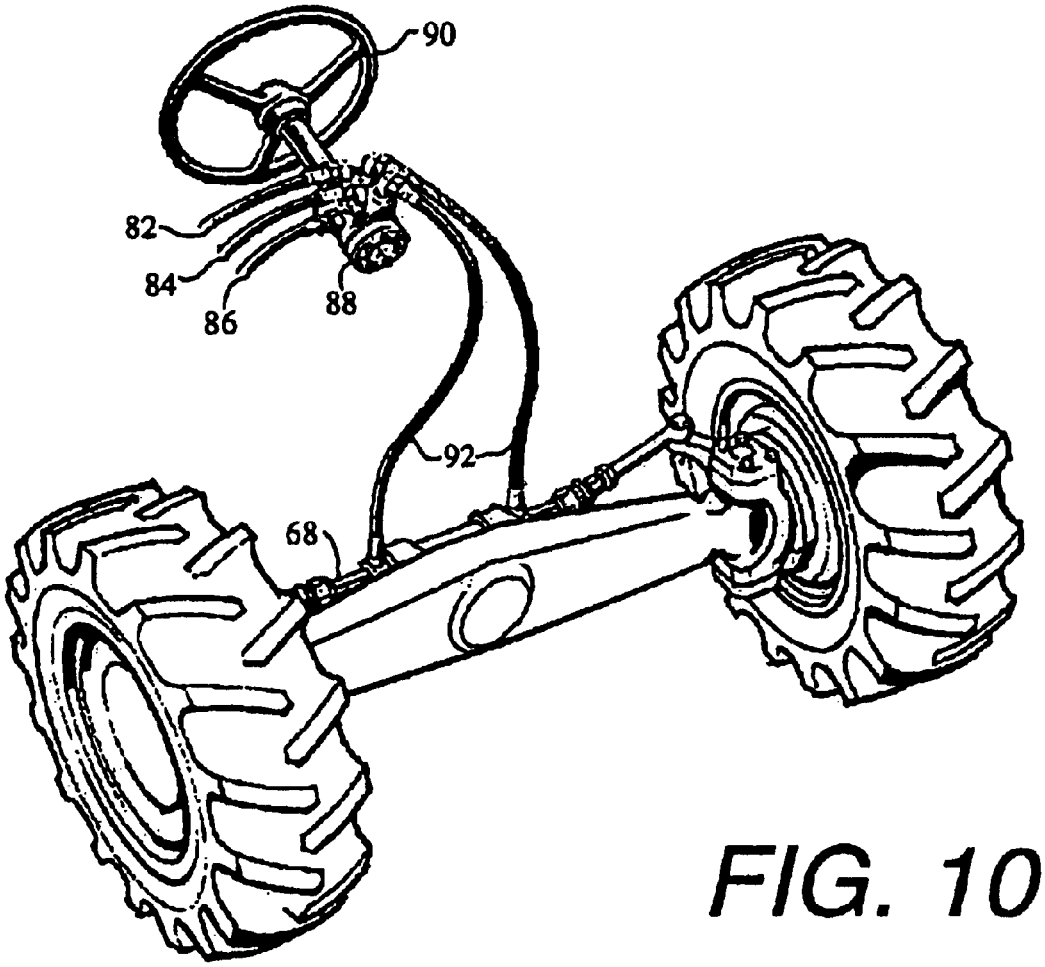
FIG. 10 is a diagram of the primary hydraulic steering system of a vehicle, such as a tractor.

The vehicle's primary steering system 38 is shown in FIG. 10 and includes a primary steering orbital hydraulic valve 88 connected to the steering wheel 90 and to both ends of the piston-and-cylinder steering unit 68 by hydraulic lines 92. The primary hydraulic steering orbital valve 88 is also connected to the control block 46 by the hydraulic lines 82, 84 and 86.

Figure 11:
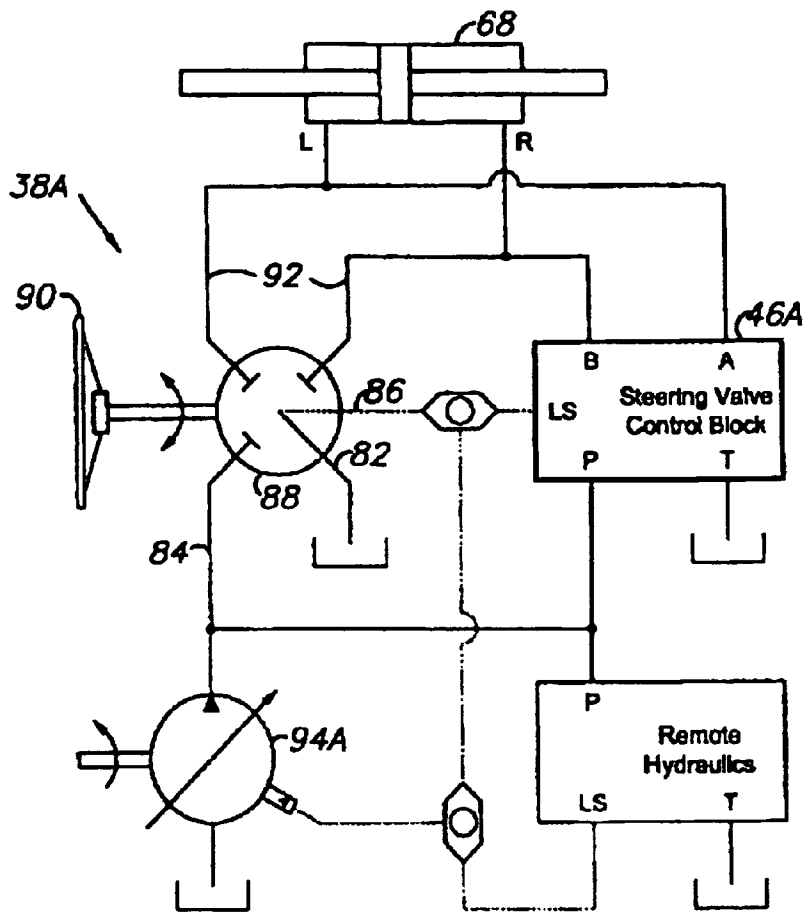
FIG. 11 is a block diagram of a vehicle hydrostatic steering system with a closed-center, load-sensing, non-reactive steering valve control block.
Figure 12:
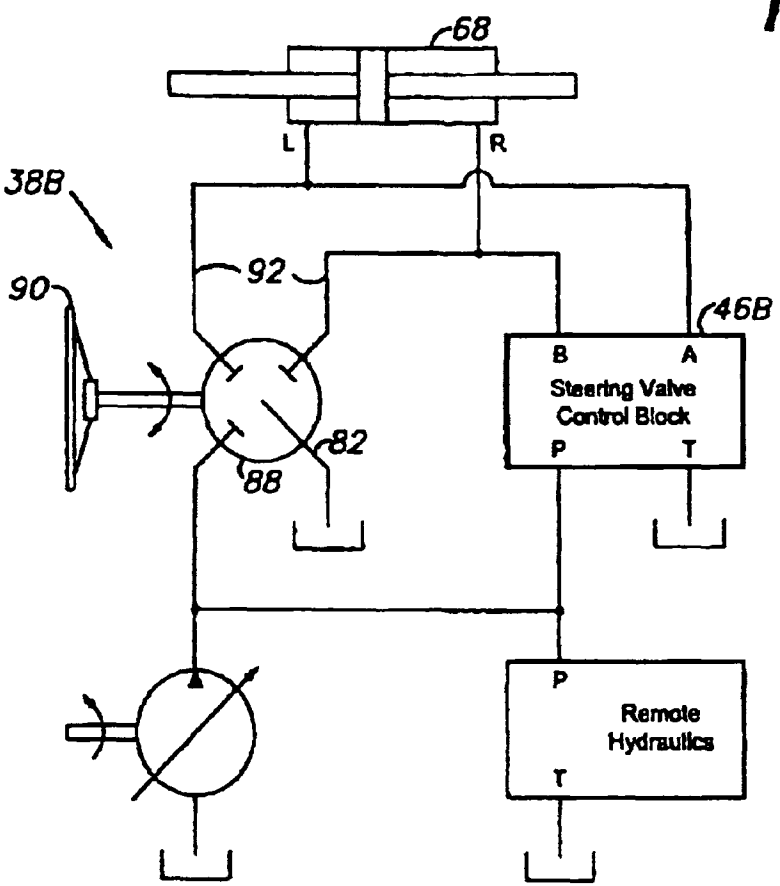
FIG. 12 is a block diagram of a vehicle hydrostatic steering system with a closed-center, pressure-compensating, non-reactive steering valve control block.
Figure 13:
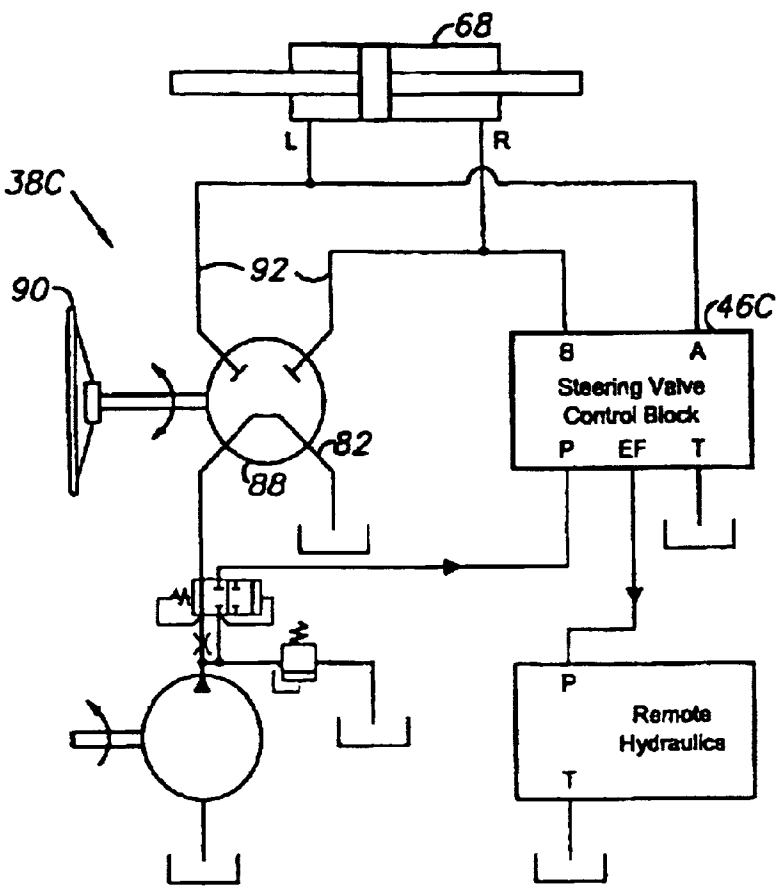
FIG. 13 is a block diagram of a vehicle hydrostatic steering system with an open-center, non-reactive steering valve control block.

FIG. 11 is a schematic diagram of the system 2 installed in parallel with a vehicle primary hydrostatic steering system 38A and a steering valve control block 46A, which has a closed-center, load-sensing, non-reactive configuration (Case A). A variable-displacement, hydraulic pump 94A provides a source of variable flow, variable pressure hydraulic fluid, as required by the greatest load placed on the hydraulic systems of the vehicle 4. FIG. 12 shows the system 2 installed in parallel with a closed-center, pressure-compensating, non-reactive vehicle primary hydrostatic steering system 38B (Case B) and a steering valve control block 46B, which utilizes hydraulic fluid at a constant pressure and a variable flow. FIG. 13 shows the system 2 installed in parallel with an open-center, non-reactive vehicle primary hydrostatic steering system 38C (Case C) and a steering valve control block 46C.

Figure 14:
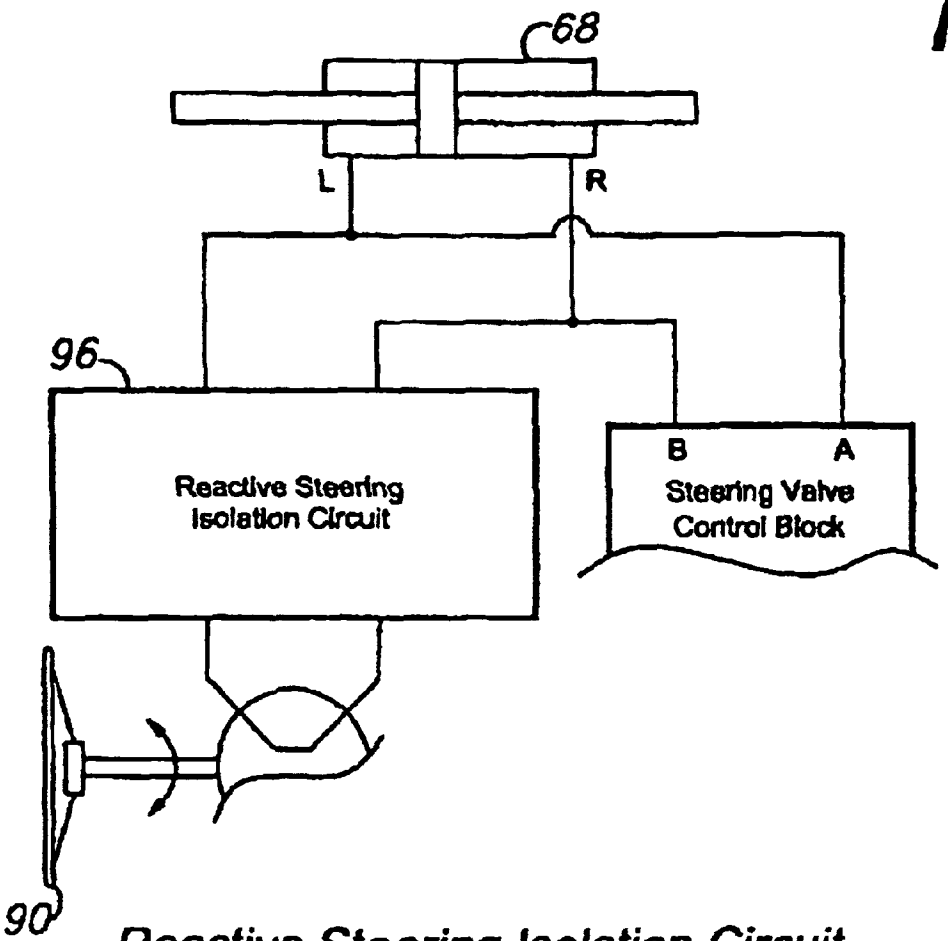
FIG. 14 is a block diagram of a vehicle hydrostatic steering system with a reactive steering isolation circuit.

FIG. 14 shows a reactive steering isolation circuit 96 installed in the hydraulic lines 92 in a steering system 38A, 38B or 38C between the primary steering orbital 88 and the tractor piston-and-cylinder steering unit 68. Reactive steering systems, which are found on some vehicles, have an hydraulic force feedback into the primary steering orbital 88 from the piston-and-cylinder steering unit 68. The isolation circuit 96 effectively converts the reactive system to a non-reactive steering system.

Figure 15:
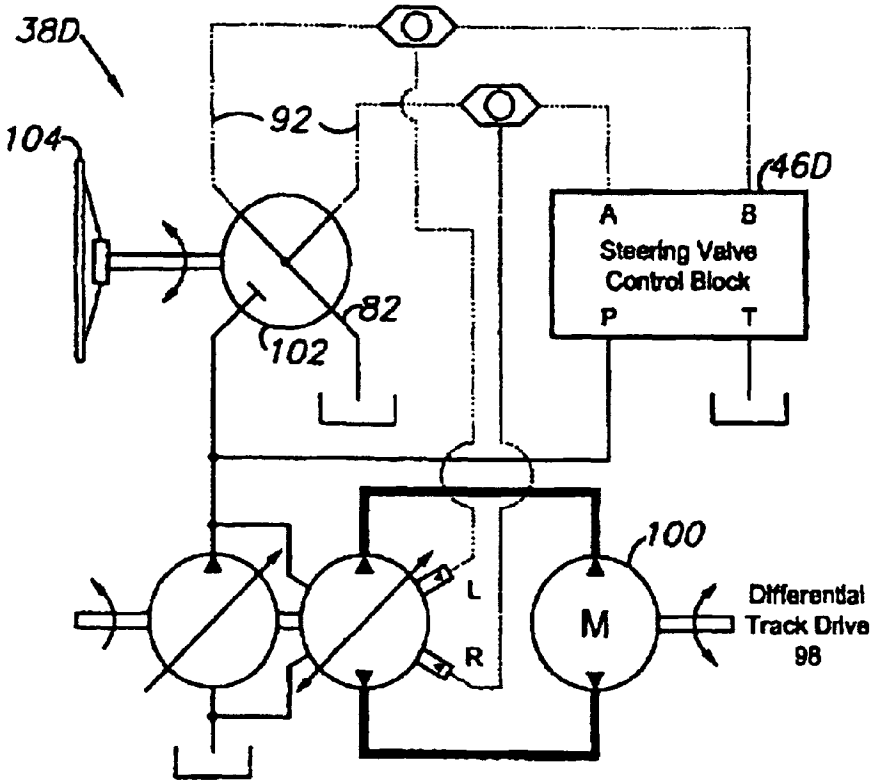
FIG. 15 is a block diagram of a dual-path hydrostatic steering system for a differential track drive vehicle.

FIG. 15 shows a vehicle primary hydrostatic steering system 38D for a track-type vehicle with a differential track drive 98 including a differential hydraulic motor 100 (Case D) and a steering valve control block 46D. A primary hydraulic control valve 102 is connected to the differential hydraulic motor 100 and is controlled by inputs from a steering wheel 104. The steering valve control block 46D is adapted for automatically steering the tracked vehicle by selectively directing pressurized hydraulic fluid to the differential track drive motor 100.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. An automatic steering control system for a vehicle, which comprises:

a GPS receiver;

a guidance controller connected to the GPS receiver;

a vehicle steering system including a steering actuator and a steering power source connected to the steering actuator;

a steering input device connected to the steering power source and the steering actuator;

the guidance controller being operably connected to the steering input device;

a loop for feeding back an operating parameter to the guidance controller, said operating parameter corresponding to a GPS-derived actual turning rate for comparison to a desired turning rate and automatic correction to a desired guide pat initiated automatically by said guidance controller in response to a discrepancy between said desired turning rate and said actual turning rate determined utilizing GPS-derived vehicle position, around speed, steering rate and course information item said GPS receiver and said guidance controller, and said correction to said desired guide path occurring automatically in response to said actual turning rate parameter based on GPS-derived vehicle position, ground speed, steering rate and course information without operator intervention.

2. The system according to claim 1, which includes:

said steering actuator and said power source being hydraulic;

said steering input device including an hydraulic steering valve control and providing a constant steering factor; and said guidance controller providing a steering input signal to said steering input device from among an input signal set including signals corresponding to left and right turns.

3. The system according to claim 2, which includes:

said constant steering factor comprising a constant steering rate;

said feedback loop providing to said guidance controller a feedback signal corresponding to a vehicle actual turning rate; and said actual turning rate comprising a function of factors including vehicle ground speed and steering rate.

4. The system according to claim 3, which includes:

said vehicle steering actuator providing said feedback signal; and an inertial based yaw rate gyro sensor in said feedback loop.

5. The system according to claim 4, which includes:

a proportional integral derivative (PID) compensator with a input connected to said guidance controller and an output;

adjustable gain inputs to said PID compensator corresponding to a computed error, an integral of said error and a time derivative of said error corresponding to an error rate; and a deadband filter with an input connected to said PID compensator output and a deadband filter output connected to said hydraulic steering valve control.

6. The system according to claim 5, which includes:

said guidance controller including a path planner;

a position/speed signal output from said GPS receiver and input to said guidance controller;

a yaw rate filter including a first input connected to and receiving a differential heading signal from said GPS receiver and an output connected to and providing a smooth heading signal to said guidance controller; and said yaw rate filter including a second input connected to said yaw rate gyro and receiving a signal corresponding to the gyroscopically-corrected actual turning rate.

7. The system according to claim 6, which includes:

a low pass noise filter wit an adjustable time constant, an input connected to said yaw rate gyro output and receiving a corrected actual turning rate signal therefrom, and an output representing an observed turning rate;

a summer with an observed turning rate input connected to said noise filter output and a desired turning rate input connected to said guidance controller and adapted to receive a desired turning rate signal therefrom; and said summer providing an output signal corresponding to a differential between said desired and observed turning rate signal to said PDI compensator.

8. The system according to claim 2, which includes:

said steering actuator comprising an hydraulic piston-and-cylinder steering unit connected to said vehicle steering;

said steering input device including a steering valve control block with left and right solenoid-actuated steering valves each having an hydraulic output connected to said steering unit, an hydraulic input and an electrical input connected to said guidance controller and receiving an on-off input signal therefrom whereby each said valve is selectively movable between respective on and off positions; and said steering valve control block including a steering rate control comprising an adjustable hydraulic flow valve with an input connected to said hydraulic power source and an output connected to said steering valve hydraulic inputs.

9. The system according to claim 8, which includes:

said adjustable hydraulic flow valve comprising a needle valve with a user-accessible steering control rate adjustment knob and variable settings corresponding to a vehicle steering aggressiveness factor;

said vehicle including an existing hydrostatic steering system; and said steering valve control block including said solenoid steering valves end said needle valve, said steering valve control block being adapted for connection in parallel with the existing hydrostatic steering system.

10. The system according to claim 8, which includes:

said steering input device including an adjustable flow, pressure compensating hydraulic valve; a directional control; and a steering cylinder displacement sensor;

a desired flow rate and an hydraulic system disturbance inputs to said pressure compensating hydraulic valve, which includes an output corresponding to an actual flow rate;

said actual flow rate and a left/right/none-steering signal comprising inputs to said directional control, which provides an output with a corresponding cylinder flow rate;

said steering cylinder displacement sensor providing an output corresponding to a steering angle; and an actual turning rate for said vehicle comprising a function of said steering angle, a ground speed of said vehicle and an external disturbance factor.

11. The system according to claim 2, wherein said vehicle is a track vehicle with a differential steering including a track drive pump and said steering input device includes:

a desired pressure associated with said hydraulic system;

a directional control receiving an actual pressure as an input and providing an output differential pressure to said track drive pump;

a gain valve G associated with the differential steering and comprising a ratio of differential RPM to signal (pressure); and the actual turning rate being a function of the differential steering gain value G, the vehicle ground speed an dan external disturbance factor.

12. The system according to claim 2, wherein said guidance controller includes a mapping module, which module includes:

a memory adapted to receive an store data corresponding to the area covered by said vehicle;

a visual display of said covered area; and an area calculation function adapted for calculating the area covered based on the GPS coordinates of the area perimeter.

13. The system according to claim 2, which includes:

said vehicle including a motive component with an hydraulic system, a working component and an articulated, hydraulically-actuated hitch interconnecting said motive and working components;

said hitch having left end right lateral displacement positions adapted for respectively displacing said working component left and right of said motive component path to compensate for motive component crosstrack deviations from a predetermined desired guide path of said working component;

a hitch control module including an input connected to said guidance controller and adapted to receive hitch displacement signals therefrom; and said hitch control module including an output connected to said articulated hitch and adapted for causing said articulated hitch to move between its lateral displacement positions.

14. The system according to claim 11, which includes:

a working component GPS receiver and guidance controller mounted on said working component; and said working component guidance controller including an output for signals corresponding to GPS positions of said working component;

said motive component guidance controller including en input for said working component GPS position signals; and said motive component guidance controller displacing said articulated hitch in response to said GPS position signals from said working component to compensate for course deviations of said motive component.

15. The system according to claim 2 wherein said guidance controller includes an auto-disengage feature activated by one or more of the disengage conditions from the set consisting of:

excessive current position error;

vehicle speed too slow;

vehicle speed too fast;

excessive turning rate;

manual steering by operator; and operator absent.

16. The system of claim 15 wherein said guidance controller includes an auto-engage feature activated by said vehicle being in proximity to a guide path within a predetermined period of time after auto-disengagement.

17. The system according to claim 1, which includes:

a primary vehicle steering system including said steering actuator and said steering power source;

an auxiliary steering system including said steering input device;

said auxiliary steering system being connected in parallel with the primary steering system to the steering power source and the steering actuator in parallel with said primary vehicle steering system; and said primary steering system including a primary steering device.

18. The system according to claim 17, wherein said vehicle includes a hydrostatic steering system comprising one type from among the group consisting of:

closed-center, load-sensing, non-reactive;

closed-center, pressure-compensating, non-reactive;

open-center, non-reactive;

reactive; and dual-path, differential track drive.

19. The system according to claim 1, which includes:

a straight-line (A–B) operating mode;

a contour operating mode for guidance along curved lines;

said guidance controller having a memory adapted for storing multiple straight-line and contour guide paths;

said guidance controller automatically steering said vehicle along straight and curved guide paths in said straight-line and contour operating nodes respectively; and said guidance controller including a switching function adapted for switching between said straight-line and contour operating modes while said automatic steering system is automatically steering said vehicle.

20. An automatic steering control system for an agricultural vehicle, which system comprises:

a GPS receiver;

a guidance controller connected to the GPS receiver;

a primary vehicle hydrostatic steering system including an hydraulic steering actuator, an hydraulic power source connected to the steering actuator and a primary steering input device directing hydraulic power from said power source to said steering actuator;

an auxiliary steering input device connected to said guidance controller, said steering power source and said steering actuator, said auxiliary steering input device including an hydraulic steering valve control and providing a constant steering rate;

said guidance controller providing a steering input signal to said auxiliary steering input device from among the input signal set consisting of left, right and none;

a feedback loop from the vehicle steering system to the guidance controller;

an inertial based yaw rate gyro sensor in said feedback loop correcting said feedback signal by smoothing the effects of course deviations associated with vehicle yaw;

a proportional integral derivative (PID) compensator with an input connected to said guidance controller and an output;

adjustable gain inputs to said PID compensator corresponding to a computed error, an integral of said error and a time derivative of said error corresponding to an error rate;

said guidance controller including a path planner;

a position/speed signal output from said GPS receiver and input to said guidance controller;

a yaw rate filter including a first input connected to and receiving a differential heading signal from said GPS receiver and an output connected to and providing a smooth heading signal to said guidance controller;

said yaw rate filter including a second input connected to said yaw rate gyro sensor and receiving a signal corresponding to the gyroscopically-corrected actual turning rate;

a low pass noise filter with an adjustable time constant and including an input connected to said yaw rate gyro sensor output and receiving a corrected actual turning rate signal therefrom and an output providing an observed turning rate output signal;

a summer with an observed turning rate input connected to said noise filter output and a desired turning rate input connected to said guidance controller and adapted to receive a desired turning rate signal therefrom;

said summer providing an output signal corresponding to a differential between said desired and observed turning rate signals to said PID compensator;

said steering actuator comprising an hydraulic piston-and-cylinder steering unit connected to said vehicle steering;

said steering input device including a steering valve control block with left and right solenoid-actuated steering valves each having an hydraulic output connected to said steering unit, an hydraulic input and an electrical input connected to said guidance controller and receiving an on-off input signal therefrom whereby each said valve is selectively movable between respective on and off positions;

said steering valve control block including a steering rate control comprising an adjustable hydraulic flow valve with an input connected to said hydraulic power source and an output connected to said steering valve hydraulic inputs;

a straight-line (A–B) operating mode;

a contour operating mode for guidance along curved lines;

said guidance controller having a memory adapted for storing multiple straight-line and contour guide paths;

said guidance controller automatically steering said vehicle along straight and contour guide paths in said straight-line and contour operating modes respectively;

said guidance controller including a switching function adapted for switching between said straight-line and contour operating modes while said automatic steering system is automatically steering said vehicle; and said guidance controller including an auto-disengage feature activated by one or more predetermined auto-disengage conditions and an auto-engage feature activated by one or more predetermined auto-engage conditions.

21. An automatic steering method for a vehicle, which comprises the steps of:

defining a guide pat pattern wit GPS locations;

storing said guide path pattern electronically in a guidance controller computer memory;

defining a desired turning rate;

storing said desired turning rate in said guidance controller computer memory;

operating said vehicle in proximity to said guide path pattern receiving GPS signals corresponding to current vehicle locations;

comparing said stored guide path GPS locations with current GPS locations;

steering said vehicle to said guide path;

deriving with GPS a vehicle operating parameter comprising an actual turning rate for said vehicle utilizing GPS-derived vehicle position, ground speed, steering rate and course information from said GPS receiver and guidance controller;

providing a feedback signal corresponding to said actual turning rate vehicle operating parameter to said guidance controller;

comparing said desired turning rate to said actual turning rate; and automatically without operator intervention correcting the course of said vehicle to said guide pat pattern in response to said feedback signal indicating a discrepancy between said desired turning rate by said guidance controller in response to said actual turning rate parameter based on GPS-derived vehicle position, ground speed, steering rate and course information.

22. The method according to claim 21, which includes the additional steps of:

providing said vehicle with a hydrostatic steering system;

using a constant steering rate as a factor in calculating steering corrections for said vehicle; and adjusting an hydraulic flow in said steering system to establish said constant steering rate.

23. The method according to claim 22, which includes the additional steps of:

providing a steering valve control block with an hydraulic control valve for adjusting said hydraulic flow in said steering system;

providing said steering valve control block with first and second solenoid-activated hydraulic valves; and activating said hydraulic valves with left and right turn commands from said guidance controller.

24. The method according to claim 22, which includes the additional steps of:

providing an inertial yaw rate gyro sensor in said feedback loop; and providing a feedback signal corresponding to vehicle yaw from said gyro sensor to said guidance controller.

25. The method according to claim 23, which includes the additional steps of:

providing a proportional integral derivative (PID) compensator and connecting an input of same to en output of said guidance controller;

modifying a guidance signal from said guidance controller with said proportional integral derivative compensator and providing said modified guidance signal as an output therefrom;

providing a deadband filter between said proportional integral derivative compensator and said steering valve control block; and providing a steering command from said deadband filter from among the set consisting of left, right and none.

26. The method according to claim 22, which includes the additional steps of:

providing en auxiliary steering system in parallel with said vehicle primary hydrostatic steering system; and assisting the operation of said vehicle primary steering system with said auxiliary steering system.

27. The method according to claim 26, which includes the additional step of automatically disengaging said auxiliary steering system in response to a predetermined condition from among the set consisting of:

excessive current position error;

vehicle speed too slow;

vehicle speed too fast;

excessive turning rate;

operator manually steering; and operator absent.

28. The method according to claim 26, which includes the additional step of automatically reengaging said auxiliary steering system in response to said vehicle being in proximity to said course within a predetermined auto-engage period.

29. The method according to claim 22, which includes the additional steps of:

calibrating said steering rate factor by manually adjusting said hydraulic flow control valve and timing the operation of said steering actuator;

providing a deadband filter between said guidance controller and said valve control block; and adjusting the sensitivity of said system by calibrating said deadband filter.

30. The method according to claim 21, which includes the additional steps of:

providing a feedback signal corresponding to an actual turning rate of said vehicle as a function of a steering command, a steering speed and external disturbances;

feeding back said actual turning rate to said guidance controller; and comparing said actual turning rate wit said desired turning rate and driving a steering command from said comparison.

31. The method according to claim 21, which includes the additional steps of:

providing a mapping module and connecting same to said guidance controller;

displaying an area covered by said system on said mapping module; and calculating a coverage area from a perimeter thereof defined by GPS locations.

32. The method according to claim 21, which includes the additional steps of:

providing motive and working components;

hitching said motive component to said working component with an articulated hitch; and laterally, automatically shifting the working component wit respect to the motive component in response to working component deviation from a predetermined GPS guide path.

33. The method according to claim 21, which includes the additional steps of:

installing said auxiliary steering system in a vehicle wit a reactive primary steering system; and installing a reactive steering isolation circuit in said primary steering system.

* * * * *